(12) United States Patent
Meric et al.

(10) Patent No.: US 6,804,820 B1
(45) Date of Patent: Oct. 12, 2004

(54) MODEM CONTROL

(75) Inventors: Jerome Meric, Senlis (FR);
Jean-Bernard Gerard Maure Beuque, Bois-Colombes (FR)

(73) Assignee: Canal+Societe Anonyme, Paris (FR)

( * ) Notice: Subject to any disclaimer, the term of this patent is extended or adjusted under 35 U.S.C. 154(b) by 0 days.

(21) Appl. No.: 09/540,175

(22) Filed: Mar. 31, 2000

Related U.S. Application Data

(63) Continuation of application No. PCT/IB98/01606, filed on Oct. 2, 1998.

(30) Foreign Application Priority Data

Oct. 3, 1997 (EP) .............................................. 97402334

(51) Int. Cl.$^7$ ................................................ G06F 13/10
(52) U.S. Cl. ........................................................ 719/321
(58) Field of Search ................................ 709/321–324, 709/318, 313; 379/93, 100.15; 719/321, 322–327, 313, 318, 314; 710/39; 375/222

(56) References Cited

U.S. PATENT DOCUMENTS

| | | | |
|---|---|---|---|
| 4,484,263 A | | 11/1984 | Olson et al. ................. 364/200 |
| 4,896,133 A | | 1/1990 | Methvin et al. .......... 340/146.2 |
| 5,327,558 A | * | 7/1994 | Burke et al. ................. 395/650 |
| 5,367,681 A | * | 11/1994 | Foss et al. ................... 395/650 |
| 5,499,364 A | * | 3/1996 | Klein et al. ............. 395/200.03 |
| 5,684,953 A | * | 11/1997 | Hummel ...................... 709/234 |
| 6,343,263 B1 | * | 1/2002 | Nichols et al. .............. 702/189 |

FOREIGN PATENT DOCUMENTS

EP        0 788 057 A1      8/1997

* cited by examiner

*Primary Examiner*—Sue Lao
(74) *Attorney, Agent, or Firm*—Osha & May L.L.P.

(57) ABSTRACT

A modem device driver, particularly for use in a receiver/decoder (2020) for a digital broadcast system in which received signals are passed through a receiver to the receiver/decoder and thence to a television set. The receiver/decoder is controlled by a virtual machine (4007) which includes a run time engine (4008). The receiver/decoder includes a plurality of interfaces to external units, and logical driver devices for the interfaces. A device driver (500) for controlling a modem interface comprises a buffer memory (503) for receiving messages, a control memory (502) for storing control parameters, and a logic unit (501) for controlling the device driver and the flow of messages. The logic unit includes a comparator (511) for matching Event, ACK, an NACK patterns stored in the control memory against the end of messages stored in the buffer memory.

27 Claims, 3 Drawing Sheets

MODEM CONTROL

This is a continuation of International Application PCT/IB98/01606, with an international filing date of Oct. 2, 1998.

The present invention relates to modems, and more specifically to the remote control of modems. It finds particular application in the interfacing of application programs to physical devices, particularly but not exclusively in the context of receiver/decoders for digital transmission systems.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

The advent of digital transmission systems intended primarily for broadcasting television signals, in particular but not exclusively satellite television systems, has opened up the possibility of using such systems for other purposes. One of these is to provide interactivity with the end user.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on. The term "digital television system" includes for example any satellite, terrestrial, cable and other system.

The present invention finds specific application in a broadcast digital television system in which received signals are passed through a receiver to a receiver/decoder and thence to a television set. The receiver/decoder (also known as a set-top-box or STB) decodes a compressed MPEG-type signal into a television signal for the television set. It is controlled by a remote controller handset, through an interface in the receiver/decoder.

One way of providing the interactivity described above is to run an application on the receiver/decoder through which the television signal is received. It is desirable to enable a variety of applications to communicate with a variety of physical devices in a transparent manner. Our co-pending applications PCT/EP97/02115 and PCTIEP97/02116 describe systems in which one or more applications can be downloaded by a set-top-box (STB) and communicate with physical devices in the STB such as parallel and serial interfaces and smartcard readers by means of a device driver for each device and an overall device manager.

Pursuant to the present invention, it has been proposed to provide the capability for a set-top-box to interface with a variety of different signal channels, such as a modem, a serial channel, a parallel channel, an MPEG (compressed and coded video signal) channel, swipe card readers, and so on. The set-top-box includes a virtual machine which includes a run-time engine. The virtual machine is coupled to a device manager which is in turn coupled to the physical interfaces of the various channels via devices and device drivers.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

As noted above, one of the channels is preferably a modem. The main object of the present invention is to provide improved control of such a modem. This is achieved by providing an improved device driver for controlling the modem. For present purposes, the precise nature of any distinctions between devices and device drivers is not important, and the term "device driver" as used herein should be construed to include any form of interface between hardware and an application, unless the context requires otherwise.

According to the invention there is provided a device driver for controlling and communicating with a modem, comprising a buffer memory for receiving and storing messages from the modem, a control memory for storing control parameters, and a logic unit for controlling the device driver and the flow of messages, wherein the logic unit includes a comparator for matching patterns stored in the control memory against messages stored in the buffer memory to generate a signal for sending to a device manager coupled to the device driver.

The device manager will usually be arranged to control a plurality of device drivers, and pass messages between the device drivers and one or more applications, but the term "device manager" is intended to encompass any entity capable of controlling the device driver, it may be a controlling application itself. Further significant features of the invention will become apparent from the following detailed description and claims.

The apparatus is most preferably implemented as a device driver in a receiver/decoder, for example for a digital transmission system as described in our co-pending applications PCT/EP97/02106-02117. In such an implementation, the device driver can operate under the control of an application, via the device manager, providing a convenient and flexible arrangement for controlling the device driver. The application is preferably run in an interpreted language and the device driver is preferably compiled.

Preferably, the comparator compares the stored patterns against a predeteimined final length of the message.

The patterns may be of a plurality of types and there may be a plurality of patterns of the same type. Such pattern types may comprise Events, ACKs (positive acknowledgements), and NACKs (negative acknowledgements), the generated signal indicating the type of pattern matched.

The device driver may be arranged to send the signal to the device manager by adding it to the message received through the modem. Commands may be passed between the device driver and the device manager in the form of Calls, which set up parameters in the device driver, IOs, which send control signals and data to the device drivers, and Events, which signal detection of patterns or message reception or transmission problems to the device manager. One form of Call command comprises at least one pattern setting command for defining one or more patterns to be searched for by the comparator.

There are preferably 3 sub-types of pattern setting command defining patterns to be searched for, one pattern setting command for each pattern type. The or at least one pattern setting command may be arranged to define a plurality of patterns to be matched, each pattern having an associated event signal to be generated on detection of the corresponding pattern.

The patterns to be searched for may be stored in respective sub-areas of the control memory. Alternatively, the patterns to be searched for may be stored in a single continuous area of the control memory.

In one embodiment, on a plurality of matches occurring, only the last match is acted on. Alternatively, on a plurality of matches occurring, the type is indicated according to a predetermined priority sequence between the different types of match.

Functions of the device driver may be implemented in hardware, for example in a dedicated integrated circuit; this may provide enhanced speed of operation. Preferably, however, at least some of the device driver is implemented in software, preferably run by processing means which runs the application; this allows greater flexibility, requires less components, and allows the device driver to be updated more readily.

The present invention extends to a method of controlling and communicating with a modem using a device driver comprising a buffer memory and a control memory, said method comprising the steps of:

receiving and storing messages from the modem in said buffer memory;

storing control parameters in said control memory, and matching patterns stored in the control memory against messages stored in the buffer memory to generate a signal for sending to a device manager coupled to the device driver.

Any of the above features may be combined together in any appropriate combination. Apparatus features may be applied to method aspects and vice versa.

Preferred features of the present invention will now be described, purely by way of example, with reference to the accompanying drawings, in which.

RECEIVER/DECODER BASICS

To assist in understanding of the device driver, the preferred platform on which the device driver operates, our digital transmission receiver/decoder will first be described briefly.

Figure 1:
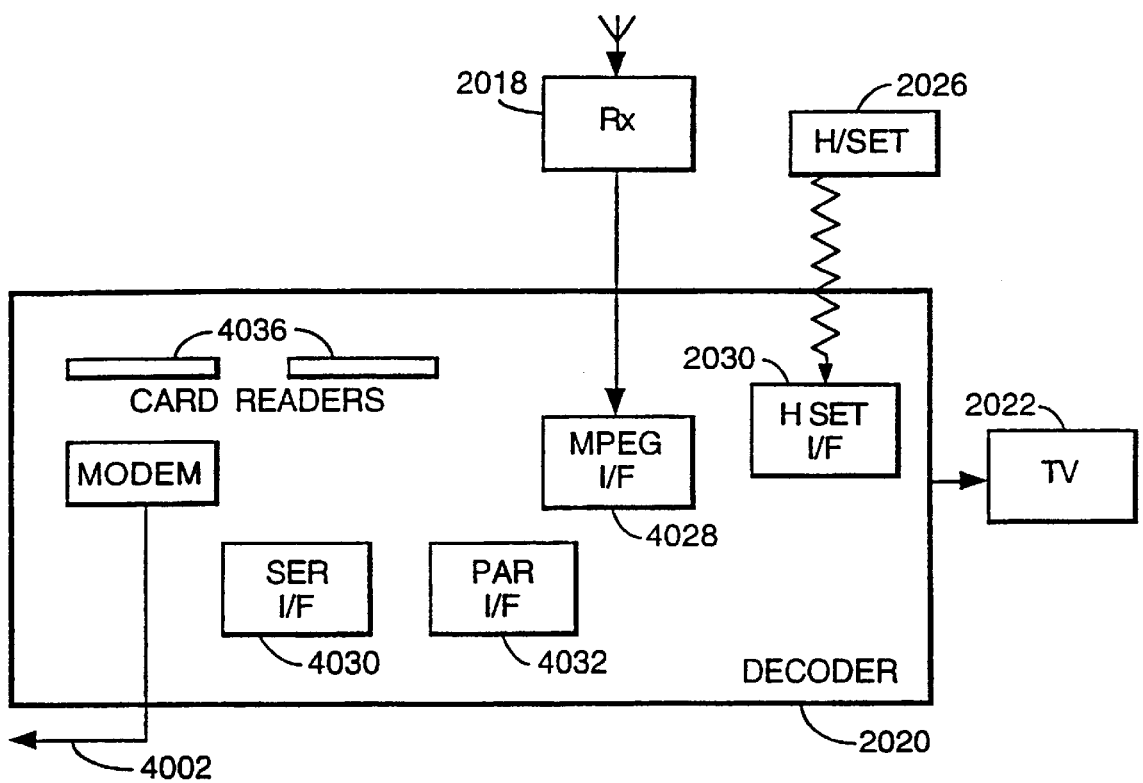
FIG. 1 is a schematic diagram of interfaces of the receiver/decoder.

Referring to FIG. 1, a receiver/decoder 2020 or set-top-box for use in a digital interactive television system in which the device driver of the embodiment is intended to be installed is schematically depicted. Details of a suitable digital interactive television system may be found in our co-pending applications PCT/EP97/02106–02117 to which reference should be made, and the disclosures of which are herein incorporated by reference. For ease of reference, parts described in more detail in the aforementioned specifications are generally designated by the reference numerals used in those specifications.

As described in more detail in the aforementioned specifications, referring to FIG. 1, the receiver/decoder 2020 includes several interfaces; specifically, a tuner 4028 for the MPEG signal flow, a serial interface 4030, a parallel interface 4032, and two card readers 4036, one for a smartcard forming part of the system and one for bank cards (used for making payments, home banking, and such like). The receiver/decoder also includes an interface 4034 to a modemmed back channel 4002 to the television signal producer, so that the user can indicate preferences and such like back to the television signal (programme) producer. The receiver also comprises a Run-Time-Engine 4008, a Device Manager 4068 and a plurality of Devices 4062 and Device Drivers 4060 for running one or more applications 4056 (see FIG. 2).

For the purposes of this specification, an application is a piece of computer code for controlling high level functions of preferably the receiver/decoder 2020. For example, when the end user positions the focus of a remote controller on a button object seen on the screen of the television set 2022 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM or FLASH memory of the receiver/decoder 2020.

Some examples of applications, described in more detail in the aforementioned applications are:

An Initiating Application which is an adaptable collection of modules enabling the receiver/decoder 2020 to be immediately operative in the MPEG-2 environment.

A Startup Application which allows any application, either downloaded or resident, to run on the receiver/decoder 2020.

A Program Guide which is an interactive application which gives full information about programming.

A Pay Per View application which is an interactive service available on each PPV channel of the digital television bouquet to enable the end user to buy the current event.

A PC Download application enabling an end user to download computer software using the PC download application.

A Magazine Browser application comprising a cyclic video broadcast of images with end user navigation via on-screen buttons.

A Teleshopping application enabling offers of goods for sale to be transmitted to the receiver/decoder 2020 and displayed on the television 2022 and enabling the user to select a particular item to buy.

Applications are stored in memory locations in the receiver/decoder 2020 and represented as resource files. The resource files comprise graphic object description unit files, variables block unit files, instruction sequence files, application files and data files, as described in more detail in the above-mentioned specifications.

In the MPEG data stream, each module comprises a group of MPEG tables. Each MPEG table may be formatted as a number of sections. In the MPEG data stream, each section has a "size" of up to 4 kbytes. For data transfer via the serial and parallel port, for example, modules similarly are split into tables and sections, the size of the section varying with the transport medium.

Modules are transported in the MPEG data stream in the form of data packets of typically 188 bytes within respective types of data stream, for example, video data streams, audio data streams and teletext data streams. Each packet is preceded by a Packet Identifier (PID) of 13 bits, one PID for every packet transported in the MPEG data stream. A programme map table (PMT table) contains a list of the different data streams and defines the contents of each data stream according to the respective PID. In addition to programmes, certain PIDs may be assigned to applications or other data contained in the data stream, the PID being identified using the PMT table.

The decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

The system can be regarded as centred on a run time engine 4008 forming part of a virtual machine 4007. This is coupled to applications on one side (the "high level" side), and, on the other side (the "low level" side), via various intermediate logical units discussed below, to the receiver/decoder hardware 4061. The receiver/decoder hardware can be regarded as including the various ports or interfaces as discussed above (the interface 2030 for the handset 2026, the MPEG stream interface 4028, the serial interface 4030, the parallel interface 4032, the interfaces to the card readers 4036, and the interface 4034 to the modemmed back channel 4002).

Figure 2:
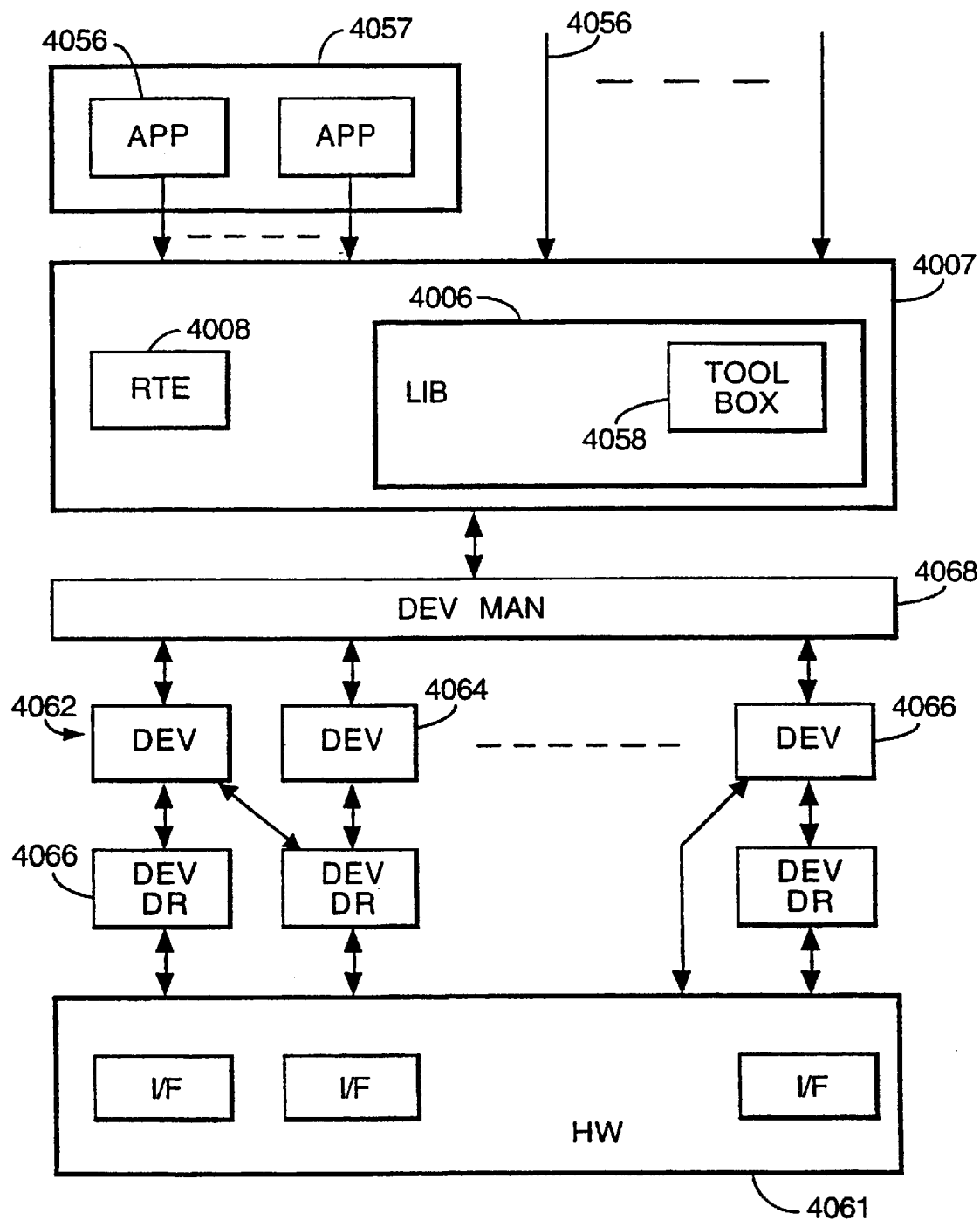
FIG. 2 is a functional block diagram of the receiver/decoder.

With reference to FIG. 2, various applications 4057 are coupled to the unit 4007; some of the more commonly used applications may be more or less permanently resident in the system, as indicated at 4057, while others will be downloaded into the system, for example, from the MPEG data stream or from other ports as required.

The unit 4007 includes, in addition to the run time engine 4008, some resident library functions 4006 which include a toolbox 4058. The library contains miscellaneous functions in C language used by the engine 4008. These include data manipulation such as compression, expansion or comparison of data structures, line drawing, and so on. The library 4006 also includes information about firmware 4061 in the receiver/decoder 2020, such as hardware and software version numbers and available RAM space, and a function used when downloading a new device 4062. Functions can be downloaded into the library, being stored in Flash or RAM memory.

The run time engine 4008 is coupled to a device manager 4068 which is coupled to a set of devices 4062 which are coupled to device drivers 4060 which are in turn coupled to the ports or interfaces. In broad terms, a device driver can be regarded as defining a logical interface, so that two different device drivers may be coupled to a common physical port. A device will normally be coupled to more than one device driver; if a device is coupled to a single device driver, the device will normally be designed to incorporate the full functionality required for communication, so that the need for a separate device driver is obviated. Certain devices may communicate among themselves.

As will be described below, there are 3 forms of communication from the devices 4062 up to the run time engine: by means of variables, buffers, and events which are passed to a set of event queues.

Each function of the receiver/decoder 2020 is represented as a device 4062. Devices can be either local or remote. Local devices 4064 include smartcards, SCART connector signals, modems, serial and parallel interfaces, a MPEG video and audio player and an MPEG section and table extractor. Remote devices 4066, executed in a remote location, differ from local devices in that a port and procedure must be defined by the system authority or designer, rather than by a device and device driver provided and designed by the receiver/decoder manufacturer.

When a new device 4062 is created, it can be installed in existing receiver/decoders 2020 by downloading the relevant application 4056 from the broadcast centre. This downloading is performed in the receiver/decoder 2020 by an application 4056 which checks the hardware and software versions and, if correct, loads the software module representing the new device 4062 and asks a procedure of the library 4006 to install the new device code within the firmware (in Flash memory). This can provide a flexible and secure installation of new functions within the receiver/decoder 2020 without affecting-the rest of the software.

The device manager 4068 is a common software interface between the application 4056 and the specific functions of the receiver/decoder 2020. The device manager 4068 controls access to devices 4062, declares receipt of an unexpected event, and manages shared memory.

The run time engine 4008 runs under the control of the microprocessor and a common application progranmning interface. They are installed in every receiver/decoder 2020 so that all receiver/decoders 2020 are identical from the application point of view.

The engine 4008 runs applications 4056 on the receiver/decoder 2020. It executes interactive applications 4056 and receives events from outside the receiver/decoder 2020, displays graphics and text, calls devices for services and uses functions of the library 4006 connected to the engine 4008 for specific computation.

The run time engine 4008 is an executable code installed in each receiver/decoder 2020, and includes an interpreter for interpreting and running applications. The engine 4008 is adaptable to any operating system, including a single task operating system (such as MS-DOS). The engine 4008 is based on process sequencer units (which take various events such as a key press, to carry out various actions), and contains its own scheduler to manage event queues from the different hardware interfaces. It also handles the display of graphics and text. A process sequencer unit comprises a set of action-groups. Each event causes the process sequencer unit to move from its current action-group to another action-group in dependence on the character of the event, and to execute the actions of the new action-group.

The engine 4008 comprises a code loader to load and download applications 4056 into the receiver/decoder memory 2028. Only the necessary code is loaded into the RAM or Flash memory, in order to ensure optimal use. The downloaded data is verified by authentication mechanism to prevent any modification of an application 4056 or the execution of any unauthorized application. The engine 4008 further comprises a decompressor. As the application code (a form of intermediate code) is compressed for space saving and fast downloading from the MPEG-2 transport stream or via a built-in receiver/decoder mode, the code must be decompressed before loading it into the RAM. The engine 4008 also comprises an interpreter to interpret the application code to update various variable values and determine status changes, and an error checker.

Before using the services of any device 4062, a program (such as an application instruction sequence) has to be declared as a "client", that is, a logical access-way to the device 4062 or the device manager 4068. The manager gives the client a client number which is referred to in all accesses to the device. A device 4062 can have several clients, the number of clients for each device 4062 being specified depending on the type of device 4062. A client is introduced to the device 4062 by a procedure "Device: Open Channel". This procedure assigns a client number to the client. A client can be taken out of the device manager 4068 client list by a procedure "Device: Close Channel".

The access to devices 4062 provided by the device manager 4068 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example, scanning tuner frequencies to find a multiplex or getting back a table from the MPEG stream. When the requested result is available, an event is put in the queue of the engine to signal its arrival. A further procedure "Device: Event" provides a means of managing unexpected events.

As noted above, the main loop of the run time engine is coupled to a variety of process sequencer units, and when the main loop encounters an appropriate event, control is temporarily transferred to one of the process sequencer units.

Thus, it can be seen that the basic system provides a platform having considerable flexibility in enabling an application to communicate with a variety of devices.

MODEM DEVICE DRIVER

The precise details of the implementation of the various functions, and the distribution between hardware and software are a matter of choice for the implementor and will not be described in detail. It is, however, noted that dedicated integrated circuits capable of performing the operations required in the present device driver are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available. The device driver can be considered as comprising a series of individually accessible functional units, each of which will hereinafter be referred to as a "command".

Each command interfaces with an application under the control of the device manager 4068 by means of one of the three standard procedures mentioned above, which are common to other devices. Information may be passed between an application and the device by means of parameter tables. For ease of reference, the three basic procedures are summarised briefly below:

1) Device: Call. This procedure can be used by an application for performing synchronous commands or data transfer. Execution of the application is suspended until control is returned when the operation by the device driver has completed; this allows operations which must be performed in strict sequence to be controlled reliably.

2) Device: I/O. This procedure allows asynchronous operation. That is, an application can send a request for a data transfer or a particular function to be performed by the device driver and execution of the application can continue while the data transfer or function is performed by the device driver.

3) Device: Event. The event trapping function enables events to be signalled by the device to an application, and for particular action to be taken by the application in response to the event independently of the code the application is executing at the time the event is signalled; effectively the application is interrupted. Events may be prioritised. Events may be used to signal events occurring on the interface, such as a bus reset, or to provide monitoring of asynchronous commands, for example by signalling completion of a requested data transfer.

Figure 3:
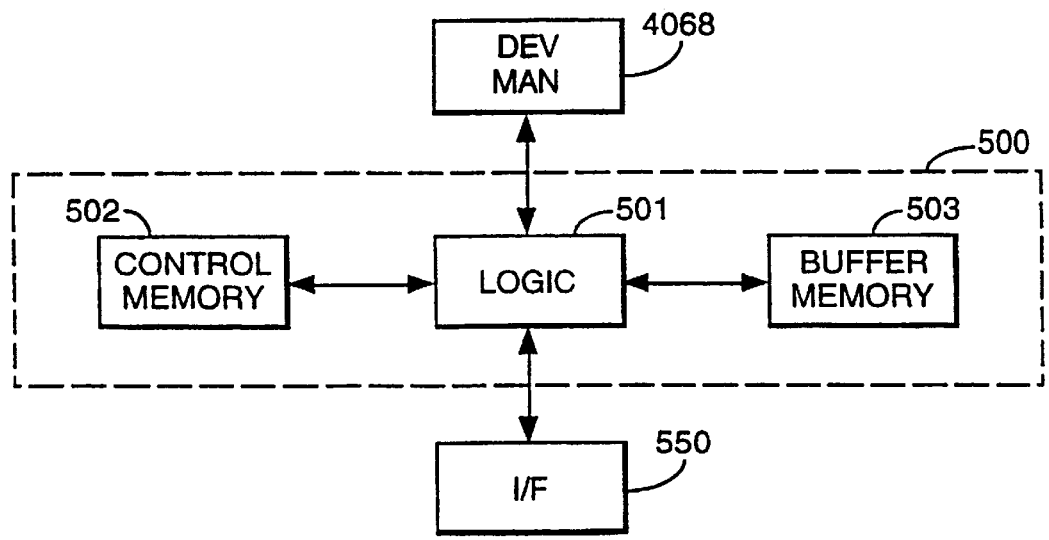
FIG. 3 shows the general logical organization of the present device driver.

The present device driver is shown as block 500 (FIG. 3), comprising a logic unit 501, a control memory 502, and a buffer memory 503. These two memories are logically distinct, but both form part of the same physical memory (more specifically, the buffer memory will form part of the RAM memory, and the control memory may form part of the RAM or FLASH memory). The device driver is coupled to the device manager 4068 and the modem interface 550 as shown. Each command will form a part of the logic unit 501, and may operate on portions of the control and/or buffer memory.

In broad terms, the modem functions in the narrow sense of modulating and demodulating signals are performed by a modem unit which may be incorporated in the interface 550 or attached thereto. Control and management of the information flowing through the interface, apart from those narrow modem functions, is performed by the device driver 500.

As described above, communication between the devices/ device drivers and the device manager 4068 is performed by 3 types of procedures: Calls, IOs, and Events. For the procedures used by the device driver 500, Calls are used to send various parameters from the application through the device manager to the device driver, IOs are used to send commands from the application through the device manager to the device driver, and Events are used to send messages from the device driver via the device manager to an application.

The commands provided in a device embodying the invention will now be described. Each command may be accessed by an application by passing an identifier of the command as a parameter via one of the above three standard procedures. Not all of the commands described below need be provided, and the functions of the commands may be altered. Although the commands may be independently provided or altered, as will be appreciated, certain synergistic benefits accrue from the combined functionality provided by the commands described.

The commands will be described in terms of the features and functions provided by each command, together with optional and preferable features. With the information given and specifications provided, actual implementation of these features should be straightforward for one skilled in the art, and the precise details are left to the implementor. As an example, each command could be implemented in software, preferably written in the C programming language and preferably compiled to run on the processor used to run the application; however the device driver may be run on a separate processor, and some or all commands may be implemented by dedicated hardware. The Call and IO commands may signal information or pass parameters back to an application by setting values in a parameter table stored in memory whose address is passed to the device.

In more detail, the procedures or commands used are as follows:

Device: Call
  Set: sets buffer sizes, timer delays.
  Comm set: sets data size (5 to 8 bits), parity, transmission rate.
  Char set: sets pause character and delay.
  Control set: enable/disable signal sent to distant equipment.
  Pattern set: sets patterns to be searched for.
Device: IO
  Command: sends a command to the device driver without interpretation.
  Send: sends data to the device driver.
  Action: sends a command to the device driver with interpretation.
  Disconnect: disconnects the device driver.
Device: Event
  Receive: signals the reception of a message.
  Off: signals a transmission problem.

A procedure also contains an error code for reporting back and (except for the Event: Off procedure) a call report, for reporting back from the device driver to the device manager. Also, a Call or IO procedure contains a memory address where the information being sent (parameters and so on) is to be found.

The functions of most of these commands are broadly conventional. However, the present system contains a special command, the Call command Pattern set. This command defines one or more patterns to be searched for by the logic unit 501. The command contains a memory address, and the memory contains, starting at that address, a series of patterns. (More specifically, the first location in the memory contains the number of patterns, followed by the individual patterns, and each individual pattern in the memory includes a header giving the length of that pattern.)

Figure 4:
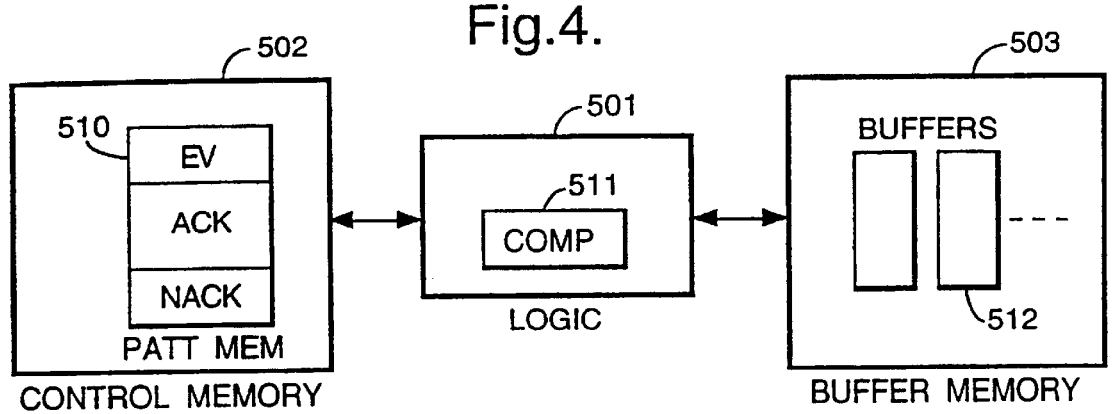
FIG. 4 shows in more detail the logical organization of the pattern handling aspects of the present device driver.

In general, 3 different types of pattern can be set, to generate Events, ACKs (positive acknowledgements), and NACKs (negative acknowledgements). It would of course be possible to include all 3 types of pattern in the same command, with the header of each pattern identifying the type of that pattern. It is preferred, however, to use 3 sub-forms of command, for the 3 types of pattern. Thus, ACK and NACK patterns, which may be required to detect reliable reception of a command by the modem are preferably set using dedicated commands, and all other patterns are used to trigger an event, each pattern being assigned a number to enable the patterns to be distinguished. These commands set up a memory zone 510 (FIG. 4) in the control memory 502; this memory zone has 3 segments, containing the Event, ACK, and NACK patterns respectively. The logic unit 501 contains a comparator unit 511 which is coupled to this memory zone.

The memory zone 510 may consist of the memory areas specified by the 3 Pattern set commands. In this case, the 3 segments of the memory zone may be physically in different regions of the memory. The comparator unit 511 will have to store the start addresses of the 3 segments and, to obtain access to the various patterns, use the number of patterns (as stored at the beginning of each segment) and the lengths of the individual patterns to determine the precise locations of the patterns and obtain access to each of them in turn as required. Alternatively, the comparator unit 511 can initialize the memory by setting up the memory zone 510 as a table of patterns in a predetermined location.

When a message is received, it is passed into a buffer in the buffer memory 503. This memory is divided into a plurality of buffers 512, so the message may occupy more than one buffer; however, the message space is logically continuous for any individual message. If pattern matching is being performed, the comparator 511 searches the last 32 characters of the message for matches to any of the patterns stored in the memory zone 510.

If a match is found, then the type of match (Event, ACK, or NACK) is written into the header of the message as stored in the buffer, and/or some suitable action is taken by the device driver.

It is to be noted that ACK and NACK pattern detection can be used to detect expected responses from the modem, for example when commands are being sent while the modem is offline. Other signals from the modem are matched to a separate list of patterns, and used to trigger events; for this reason the setting of ACK and NACK patterns is preferably performed independently of the setting of a list of patterns corresponding to unexpected events or other messages from the modem.

In this way, it is possible for an application to communicate with any of a variety of modems. For example, many modems may conform generally to a standard, such as the Hayes standard, for instruction sequences and responses, but may have additional features, for which a proprietary response sequence is generated. In such a case, the ACK and NACK patterns will be set to standard patterns, and the response sequences corresponding to additional features can be assigned to event signals.

Figure 5:
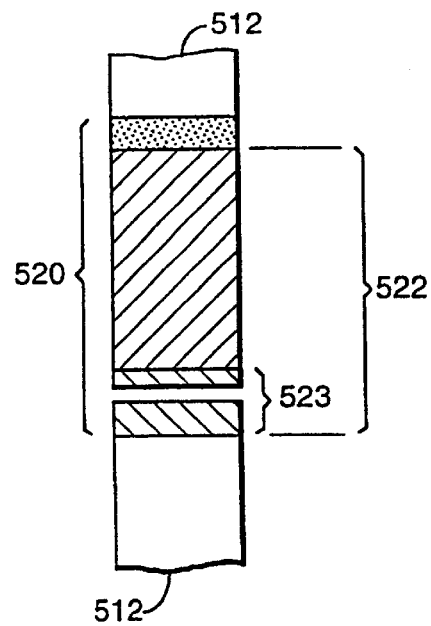
FIG. 5 illustrates message structure and storage.

FIG. 5 shows a message 520 resident in the buffer memory 503. The message consists of a header 521 and a body 522. The message in this case is physically divided between two buffers 512 and 512'. The comparator 520 performs pattern matching (that is, searching for a match with the patterns stored in the memory area 510) over the last 32 character region 523 of the body 522 of the message. The nature of any match found is inserted into the message header 521 in the buffer memory.

It is possible for more than one match to occur, in two ways. First, two patterns of the same type may occur (at different positions in the last 32 characters of the message). This double match can be ignored, that is, treated as a single match. Second, two matches of different types may occur (again, at different positions in the last 32 characters). Depending on the circumstances, the comparator 511 may be arranged to indicate the match type according to either a predetermined priority sequence between the different types of match, or which of the patterns is closer to the end of the message.

In Command mode, that is, when the modem parameters are being set up, this technique can be used to send a command message to the device driver. The message is interpreted by the device driver and not sent through the interface to, for example, a data server. For each command sent, the device driver searches for a pattern in the return message and responds to the device driver accordingly.

In this mode, it is also possible to receive a message through the interface without having sent a command. This can happen if, for example, a ring voltage is detected. The device driver should also search for a pattern in the event pattern list in that case.

In On-line mode, the Modem is connected to a data server and it is possible to receive messages from this server. The device driver searches for a pattern in the last 32 characters received from the data server.

The above commands and events are merely illustrative, and the invention may be implemented in a variety of ways, and, in particular, some commands may be combined with others which perform similar functions, or some may be omitted in simplified implementations. Hardware and software implementations of each of the functions may be freely mixed, both between commands and within a single command.

It will be readily understood that the functions performed by the hardware, the computer software, and such like are performed on or using electrical and like signals. Software implementations may be stored in ROM, or may be stored or patched in FLASH.

It will be understood that the present invention has been described above purely by way of example, and modifications of detail can be made within the scope of the invention.

Each feature disclosed in the description, and (where appropriate) the claims and drawings may be provided independently or in any appropriate combination.

What is claimed is:

1. A device driver for controlling and communicating with a modem, comprising a buffer memory for receiving and storing messages from the modem, a control memory for storing control parameters, and a logic unit for controlling the device driver and the flow of messages, wherein the logic unit includes a comparator for matching patterns stored in the control memory against a message stored in the buffer memory to generate a signal for indicating a type of pattern matched, wherein the signal is inserted into the message for transmission to a device manager coupled to the device driver, and wherein commands between the device driver and the device manager are capable of being passed synchronously and asynchronously.

2. A device driver according to claim 1 wherein the comparator compares the stored patterns against a predetermined final length of the message.

3. A device driver according to claim 1 wherein the patterns are of a plurality of types and there may be a plurality of patterns of the same type.

4. A device driver according to claim 3 wherein the pattern types comprise Events, ACKs (positive acknowledgements), and NACKs (negative acknowledgements), the generated signal indicating the type of pattern matched.

5. A device driver according to claim 4 wherein the device driver sends the signal to the device manager by adding it to the message received through the modem.

6. A device driver according to claim 4 wherein commands are passed between the device driver and the device manager in the form of Calls, which set up parameters in the device driver, IOs, which send control signals and data to the device drivers, and Events, which signal detection of patterns or message reception or transmission problems to the device manager.

7. A device driver according to claim 6 wherein one form of call command comprises at least on pattern setting command for defining one or more patterns to be searched for by the comparator.

8. A device driver according to claim 7 wherein there are 3 sub-types of pattern setting command defining patterns to be searched for, one pattern setting command for each pattern type.

9. A device driver according to claim 7 wherein the or at least one pattern setting command is arranged to define a plurality of patterns to be matched, each pattern having an associated event signal to be generated on detection of the corresponding pattern.

10. A device driver according to claim 4 wherein the patterns to be searched for are stored in respective sub-areas of the control memory.

11. A device driver according to claim 4 wherein the patterns to be searched for are stored in a single continuous area of the control memory.

12. A device driver according to claim 1 wherein, on a plurality of matches occurring, only the last match is acted on.

13. A device driver according to claim 1 wherein on a plurality of matches occurring, a type is indicated according to a predetermined priority sequence between the different types of match.

14. A method of controlling and communicating with a modem using a device driver comprising a buffer memory and a control memory, said method comprising the steps of:
   receiving and storing messages from the modem in said buffer memory;
   storing control parameters in said control memory, and
   matching patterns stored in the control memory against a message stored in the buffer memory to generate a signal for indicating a type of pattern matched, wherein the signal is inserted into the message for transmission to a device manager coupled to the device driver,
   wherein commands between the device driver and the device manager are capable of being passed synchronously and asynchronously.

15. A method according to claim 14 wherein the stored patterns are compared against a predetermined final length of the message.

16. A method according to claim 14 wherein the patterns are of a plurality of types and there may be a plurality of patterns of the same type.

17. A method according to claim 16 wherein the pattern types comprise Events, ACKs (positive acknowledgements), and NACKs (negative acknowledgements), the generated signal indicating the type of pattern matched.

18. A method according to claim 17 wherein the device driver sends the signal to the device manager by adding it to the message received through the modem.

19. A method according to claim 17 wherein commands are passed between the device driver and the device manager in the form of Calls, which set up parameters in the device driver, IOs, which send control signals and data to the device drivers, and Events, which signal detection of patterns or message reception or transmission problems to the device manager.

20. A method according to claim 19 wherein one form of call command comprises at least on pattern setting command for defining one or more patterns to be searched for in the control memory.

21. A method according to claim 20 wherein there are 3 sub-types of pattern setting command defining patterns to be searched for, one pattern setting command for each pattern type.

22. A method according to claim 20 wherein the or at least one pattern setting command is arranged to define a plurality of patterns to be matched, each pattern having an associated event signal to be generated on detection of the corresponding pattern.

23. A method according to claim 20 wherein the patterns to be searched for are stored in respective sub-areas of the control memory.

24. A method according to claim 20 wherein the patterns to be searched for are stored in a single continuous area of the control memory.

25. A method according to claim 14 wherein, on a plurality of matches occurring, only the last match is acted on.

26. A method according to claim 14 wherein on a plurality of matches occurring, a type is indicated according to a predetermined priority sequence between the different types of match.

27. A device driver according to claim 1, wherein the device driver further comprises a part of a receiver/decoder.

* * * * *

UNITED STATES PATENT AND TRADEMARK OFFICE
CERTIFICATE OF CORRECTION

PATENT NO. : 6,804,820 B1  Page 1 of 1
DATED : October 12, 2004
INVENTOR(S) : Jerome Meric et al.

It is certified that error appears in the above-identified patent and that said Letters Patent is hereby corrected as shown below:

Title page,
Item [75], Inventors, please correct the second inventor's name from "Jean-Bernard Gerard Maure Beuque" to -- Jean-Bernard Gerard Maurice Beuque --;
Item [57], ABSTRACT, third line from the bottom, please replace "an" with -- and --;

Column 11,
Line 9, please replace the word "call" with -- Call --;
Line 9, please replace the word "on" with -- one --;

Column 12,
Line 22, please replace the word "call" with -- Call --.

Signed and Sealed this

Tenth Day of May, 2005

JON W. DUDAS
*Director of the United States Patent and Trademark Office*